United States Patent
Lee et al.

(10) Patent No.: US 10,298,637 B2
(45) Date of Patent: May 21, 2019

(54) METHOD FOR TRANSMITTING BROADCASTING CONTENTS IN REAL-TIME AND DEVICE FOR SAME

(71) Applicant: SK TELECOM CO., LTD., Seoul (KR)

(72) Inventors: Jongmin Lee, Seoul (KR); Kyungjun Lee, Seoul (KR); Yonghwan Ho, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 177 days.

(21) Appl. No.: 15/296,291

(22) Filed: Oct. 18, 2016

(65) Prior Publication Data

US 2017/0041362 A1 Feb. 9, 2017

Related U.S. Application Data

(63) Continuation of application No. PCT/KR2015/003886, filed on Apr. 17, 2015.

(30) Foreign Application Priority Data

Apr. 18, 2014 (KR) .......................... 10-2014-0046408
Apr. 17, 2015 (KR) .......................... 10-2015-0054645

(51) Int. Cl.
*G06F 15/16* (2006.01)
*H04L 29/06* (2006.01)
(Continued)

(52) U.S. Cl.
CPC ...... *H04L 65/4076* (2013.01); *H04L 67/2842* (2013.01); *H04N 21/2225* (2013.01); *H04N 21/258* (2013.01); *H04N 21/6581* (2013.01)

(58) Field of Classification Search
USPC ................ 709/217, 218, 219, 223, 224, 231
See application file for complete search history.

(56) References Cited

U.S. PATENT DOCUMENTS 9,743,125 B2 * 8/2017 Brand .............. H04N 21/41407
2006/0262785 A1 * 11/2006 Duggal ................... H04L 67/04
370/389

(Continued)

FOREIGN PATENT DOCUMENTS

KR 10-2012-0023315 A 3/2012
KR 10-2014-0021371 A 2/2014
(Continued)

OTHER PUBLICATIONS

Japanese Office Action dated Oct. 24, 2017 corresponding to Japanese Application No. 2017-506241.
(Continued)

*Primary Examiner* — Liang Che A Wang
(74) *Attorney, Agent, or Firm* — Hauptman Ham, LLP (57) ABSTRACT

A real-time broadcasting contents transmission method and device are disclosed. In an embodiment, the device stores a streaming list which is information about one or more streaming contents received from a contents providing server. When a request being transmitted to the contents providing server is received from a terminal device through the communication unit, the device determines whether the requested streaming content is registered in the streaming list. If the requested streaming content is registered in the streaming list, the device branches the streaming content received from the contents providing server and then, after delay for a predetermined time, transmits the streaming content to the terminal device.

4 Claims, 8 Drawing Sheets

(51) Int. Cl.
H04N 21/2225 (2011.01)
H04N 21/258 (2011.01)
H04N 21/658 (2011.01)
H04L 29/08 (2006.01)

(56) References Cited

U.S. PATENT DOCUMENTS

| | | | |
|---|---|---|---|
| 2008/0256178 A1* | 10/2008 | Kim | H04N 21/4331 |
| | | | 709/203 |
| 2010/0146074 A1* | 6/2010 | Srinivasan | G06F 9/5077 |
| | | | 709/218 |
| 2012/0047328 A1* | 2/2012 | Williams | G11B 5/09 |
| | | | 711/118 |
| 2015/0229564 A1* | 8/2015 | Hong | H04W 40/38 |
| | | | 370/328 |
| 2015/0256584 A1* | 9/2015 | Sakaguchi | H04L 12/2812 |
| | | | 709/219 |
| 2017/0041362 A1* | 2/2017 | Lee | H04N 21/2225 |

FOREIGN PATENT DOCUMENTS

| | | |
|---|---|---|
| KR | 10-2014-0024553 A | 3/2014 |
| KR | 10-2014-0031433 A | 3/2014 |
| KR | 10-2014-0032064 A | 3/2014 |
| WO | 2013/100573 A1 | 7/2013 |
| WO | 2013/173696 A1 | 11/2013 |

OTHER PUBLICATIONS

International Search Report dated Jul. 13, 2015 for PCT/KR2015/003886.
Chinese Office Action dated Sep. 4, 2018, in connection with the Chinese Patent Application No. 201580020256.1.

* cited by examiner

METHOD FOR TRANSMITTING BROADCASTING CONTENTS IN REAL-TIME AND DEVICE FOR SAME

CROSS-REFERENCE TO RELATED APPLICATIONS

The present application is a continuation of International Patent Application No. PCT/KR2015/003886, filed Apr. 17, 2015, which is based upon claims the benefit of priority to Korean Patent Application No. 10-2014-0046408, filed on Apr. 18, 2014, and Korean Patent Application No. 10-2015-0054645, filed on Apr. 17, 2015. The disclosure of the above-listed applications is hereby incorporated by reference herein in its entirety.

TECHNICAL FIELD

The present invention relates to a contents delivery network (CDN) for real-time transmission of broadcasting contents and, more particularly, to a real-time broadcasting contents transmission method and device for reducing a traffic of a network and a load of a contents providing server by caching contents being broadcasted in real time to a terminal device and providing the cached contents to a third-party terminal device.

BACKGROUND ART

The advent of the ubiquitous era allows a user to freely access a network anywhere anytime without being aware of a terminal device, thus causing an explosive increase in network traffic. Particularly, at the request of a terminal device, a contents provider (CP) can provide large-volume contents via a network of any other internet service provider (ISP). In this case, due to concentration of traffic at internet exchange (IX) points and a resultant bottleneck, some problems such as an unstable network access and a degradation of a communication quality may be invited.

Introduced to solve such problems is a contents delivery network (CDN) for deploying a plurality of local caching devices at edges of an ISP network, transferring contents in advance, offered by a CP, to the local caching devices, and providing such contents in response to a user's request. The CDN is composed of a load balancer (a global server load balancing, GSLB) and local caching devices. The load balancer selects, in response to a user's request, the local caching device capable of providing the best service. The local caching device previously stores contents in the order of a high caching hit and performs, in response to a user's request, pushing or caching of the stored contents.

By the way, in case of live streaming, the local caching device merely uses splitting due to the limit of having to provide contents in real time. Namely, the local caching device can merely distribute contents, received from the CP through one stream, to a number of terminal devices and cannot use pushing and caching as used in on-demand streaming.

Accordingly, even in case of live streaming that is incapable of using normal caching, technique to reduce a traffic concentration for the CP and a load of network traffic due to duplicate transmission of contents is needed.

SUMMARY

The present invention proposes, in a contents delivery service, a real-time broadcasting contents transmission method and device capable of permitting caching as well as splitting for a local caching device.

In addition, the present invention proposes a real-time broadcasting contents transmission method and device in which a contents transmission control device branches streaming content, being already received, and then delivers the branched streaming content to a local caching device after delay such that the local caching device can cache contents being transmitted in real time.

The present invention is not limited to the above objects, and any other object, even though not mentioned herein, may be well understood from the following description.

A contents transmission control device according to an aspect of the present invention includes a communication unit, a storage unit, and a control unit.

The communication unit is configured to transmit and receive data to and from a contents providing server and a local caching device distributed over and deployed in a network. The storage unit is configured to store a streaming list which is information about one or more streaming contents received from the contents providing server. The control unit is configured to, when a request being transmitted to the contents providing server for streaming content is received from a terminal device through the communication unit, determine whether the requested streaming content is registered in the streaming list, and configured to, if the requested streaming content is registered in the streaming list, branch the streaming content received from the contents providing server and then, after delay for a predetermined time, transmit the streaming content to the terminal device.

Additionally, a local caching device according to an aspect of the present invention includes a communication unit, a storage unit, and a control unit. The communication unit is configured to transmit and receive data through a network. The storage unit is configured to store streaming content. The control unit is configured to, when a request for streaming content is received from a terminal device, receive the streaming content being transmitted to the terminal device through a contents transmission control device, to determine whether any streaming content identical with the received streaming content is stored in the storage unit, to transmit a caching hit notification to the contents transmission control device if the identical streaming content is stored, and to transmit the stored streaming content to the terminal device depending on a chunk signature offered from the contents transmission control device.

Additionally, a contents transmission method according to an aspect of the present invention includes step of receiving, at a contents transmission control device, a request for streaming content, the request being transmitted to a contents providing server through a network; step of determining, at the contents transmission control device, whether the requested streaming content is registered in a streaming list which is information about one or more streaming contents received from the contents providing server; if it is determined that the requested streaming content is registered in the streaming list, first transmission step of, at the contents transmission control device, branching and delaying the streaming content received from the contents providing server and then transmitting the streaming content to the terminal device through the network; and if it is determined that the requested streaming content is not registered in the streaming list, second transmission step of, at the contents transmission control device, delivering a request for the streaming content to the contents providing server and then transmitting the streaming content, received from the contents providing server, to the terminal device through the network.

The present invention allows caching in real-time broadcasting contents transmission, thus reducing a traffic concentration for a CP and a load of network traffic due to duplicate transmission of contents.

Particularly, a contents transmission control device delivers delayed streaming of streaming content, being already received, to a local caching device and thereby allows the local caching device to cache the streaming content by using prefix caching and to transmit the cached streaming content.

Other various advantages and effects will be disclosed explicitly or implicitly in embodiments of this invention to be described below in detail.

DESCRIPTION OF DRAWINGS

The accompanying drawings, included as a part of the present description so as to assist the understanding of this invention, offer embodiments of this invention and also illustrate technical features of this invention.

DETAILED DESCRIPTION

Hereinafter, embodiments of the present invention will be described with reference to the accompanying drawings. While the following description is particularly shown and described with reference to exemplary embodiments thereof, it will be understood by those skilled in the art that various changes in form and details may be made therein without departing from the scope of this invention.

In some cases, well known techniques may not be described or illustrated in detail to avoid obscuring the subject matter of the present invention.

When it is stated in the entire description that a certain article "comprises" or "includes" a certain element, this means that the article may further have any other element unless stated differently. In addition, the term "unit" or "module", used herein, may refer to the unit of processing at least one function or operation, and may be implemented as hardware, software, or combinations thereof. In addition, singular forms are intended to include plural forms unless the context clearly indicates otherwise.

The terms used in describing various embodiments of this disclosure are only examples for describing a specific embodiment but do not limit such embodiments.

A contents transmission system according to an embodiment of this invention proposes a method for reducing a traffic concentration for a contents provider (CP) and a load of network traffic due to duplicate transmission of contents by allowing caching in live streaming, e.g., internet protocol television (IPTV), having to broadcast contents in real time without delay unlike on-demand streaming. Hereinafter, "streaming content" refers to live streaming content having to be broadcasted in real time, and "streaming" refers to live streaming.

At the outset, the entire configuration of a contents transmission system according to an embodiment of this invention will be described.

Figure 1:
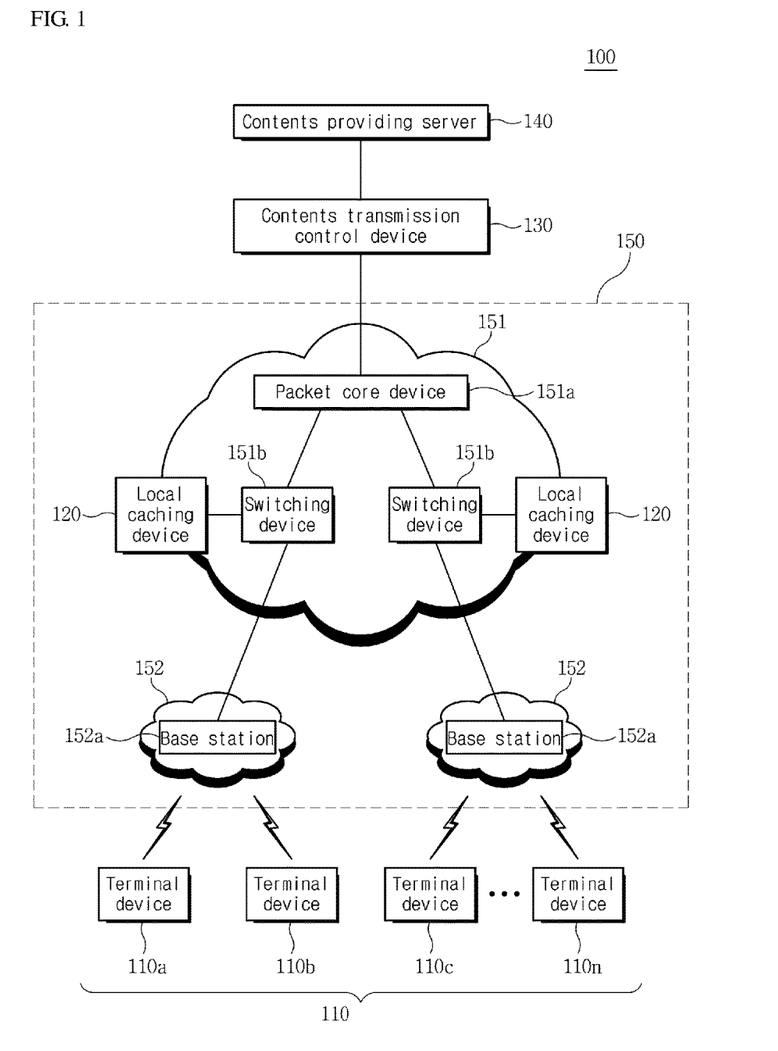
FIG. 1 is a diagram illustrating the entire configuration of a contents transmission system according to an embodiment of the present invention.

FIG. 1 is a diagram illustrating the entire configuration of a contents transmission system 100 according to an embodiment of the present invention. The configuration of the contents transmission system 100 shown in FIG. 1 indicates functional elements distinguished functionally from each other, and one or more thereof may be integrated with each other in a real physical environment.

Referring to FIG. 1, the contents transmission system 100 according to an embodiment of this invention may be configured to include a plurality of terminal devices 110, one or more local caching devices 120, a contents transmission control device 130, a contents providing server 140, and a network 150.

Specifically, the terminal device 110 is an element configured to request streaming contents from the contents providing server 140 through the network 150 and to receive and output the requested streaming contents. For convenience of description, the terminal devices 110 may be separated into the first terminal device 110a to the n-th terminal device 110n.

The terminal device 110 according to an embodiment of this invention may transmit or receive data through the network 150, and any device capable of processing and outputting streaming contents may be allowed therefor. For example, the terminal device 110 may include, but not limited to, a smart phone, a tablet, a laptop, a portable multimedia player, a phablet, a personal digital assistant, an e-book reader, and the like.

Next, the local caching device 120 is an element distributed over and deployed in the network 150 and configured to cache streaming content, which is being transmitted through the network 150, and to transmit the cached streaming content to the terminal device 110. The local caching device 120 monitors data being transmitted between the terminal device 110 and the contents providing server 140 through the network 150, receives a request for streaming content being transmitted from the terminal device 100 to the contents providing server 140 through the network 150, and receives streaming content being transmitted from the contents providing server 140 to the terminal device 110. If a request for streaming content is made from the terminal device 110, the local caching device 120 receives streaming content being transmitted to the terminal device 110 through the contents transmission control device 130 and then determines whether any streaming content identical with the received streaming content is stored in a storage unit. If it is determined that the identical streaming content is stored, the local caching device 120 transmits a cache hit notification to the contents transmission control device 130 and then, based on a chuck signature offered from the contents transmission control device 130, transmits the stored streaming content to the terminal device.

A detailed description about the local caching device 120 will be given below with reference to FIG. 3.

Next, the contents transmission control device 130 is an element connected to the network 150 and configured to control a data flow into the network 150 from other network (not shown) and to cache and transmit streaming contents through one or more local caching devices 120 distributed over and deployed in the network 150.

Specifically, the contents transmission control device 130 stores a streaming list, i.e., a list of streaming contents received from the contents providing server 140 and transmitted to the terminal device 110 through the network 150. Additionally, when a request, transmitted to the contents providing server 140, for streaming content is received from the terminal device 110, the contents transmission control device 130 determines whether the requested streaming content is registered in the streaming list. If registered, the contents transmission control device 130 branches streaming content being received from the contents providing server 140 and then, after delay for a predetermined time, transmits the streaming content to the terminal device 110 through the network 150. A delay value may be set depending on a time required for the local caching device 120 to determine a caching hit.

A detailed description about the contents transmission control device 130 will be given below with reference to FIG. 2.

Next, the contents providing server 140 is a server device of a CP for providing contents to the terminal device 110 through the network 150. In particular, contents provided by the contents providing server 140 according to an embodiment of this invention may be broadcasted in real time.

Finally, the network 150 is an infrastructure for the contents providing server 140 to provide streaming contents to the terminal device 110. The network 150 may be formed of, but not limited to, a mobile communication network such as CDMA (Code Division Multiple Access), WCDMA (Wideband CDMA), HSPA (High Speed Packet Access), or LTE (Long Term Evolution), a wired communication network such as Ethernet, xDSL (x Digital Subscriber Line), HFC (Hybrid Fiber Coax), or FTTH (Fiber To The Home), a wireless communication network such as WiFi, Wibro, Wimax, or UWB (Ultra WideBand), or combinations of the above communication networks. The network 150 according to an embodiment of this invention may include one or more access networks 152 connected to the terminal devices 110, and a core network 151 coupling the one or more access networks 152 and connected to the contents transmission control device 130.

Specifically, the core network 151 is an element configured to couple the access networks 152 and to perform functions of call processing, mobility control, switching, etc., and may include an evolved packet core (EPC) 151*a* and a plurality of switching devices 151*b*. The EPC 151*a* is an element for managing and controlling a packet flow and performing connection with other network (not shown), and the switching device 151*b* is an element for performing a packet delivery to the access network 152.

Additionally, the access network 152 is a subscriber network capable of transmitting and receiving data to and from the terminal device 110 in a wired or wireless manner. Particularly, the access network 152 according to an embodiment of this invention may be implemented with a base station 152*a* capable of separately processing a digital signal and a radio signal by being formed of a plurality of digital units (DUs) and a radio unit (RU) centralized on each DU.

Further, the network 150 according to an embodiment of this invention may distribute and deploy the local caching devices 120 over and at edges thereof, and also provide, through the switching device 151*b* connected thereto, streaming contents to the respective terminal devices 110 connected to the access network 152. At this time, a request, sent from the terminal device 110, for streaming content is transmitted to the contents providing server 140 through one of the local caching devices 120 and the contents transmission control device 130. On the contrary, streaming content sent from the contents providing server 140 is delivered to the terminal device 110 through the contents transmission control device 130 and one of the local caching devices. For this, the location caching device 120 may receive, using mirroring technique or through rerouting of switch/router, data transmitted between the terminal device 110 and the contents providing server 150. Here, 'mirroring technique' refers to technique of duplicating and bringing a mobile packet, being delivered through the network 150, without influence on traffic. Additionally, the contents transmission control device 130 may be connected between the packet core device 151*a* of the core network 151 and an external network, receive a request, sent to the contents providing server 140, for streaming content, and receive streaming content sent from the contents providing server 140.

Hereinafter, the configuration of the contents transmission control device 130 according to an embodiment of this invention will be described in detail.

Figure 2:
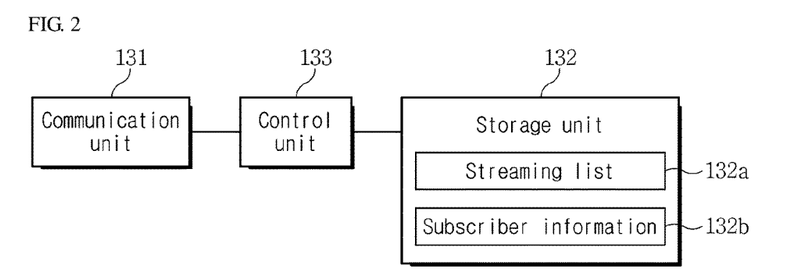
FIG. 2 is a block diagram illustrating the configuration of a contents transmission control device according to an embodiment of the present invention.

FIG. 2 is a block diagram illustrating the configuration of the contents transmission control device 130 according to an embodiment of the present invention. The configuration of the contents transmission control device 130 shown in FIG. 2 indicates functional elements distinguished functionally from each other, and one or more thereof may be physically divided from or integrated with each other.

Referring to FIG. 2, the contents transmission control device 130 according to an embodiment of this invention may be configured to include a communication unit 131, a storage unit 132, and a control unit 133.

The communication unit 131 is an element configured to transmit or receive data to or from the contents providing server 140 and the local caching device 120. Specifically, the communication unit 131 monitors the network 150, receives streaming content or a request therefor being transmitted between the terminal device 110 and the contents providing server 140, and then delivers it to the control unit 133. Also, the communication unit 131 may transmit streaming content to the local caching device 120 through the network 150 and transmit a request for streaming content to the content providing server 140 through other network (not shown). Here, other network (not shown) may be, but not limited to, another public network or dedicated network which is different from the network 150.

The storage unit 132 is an element configured to store information and programs required for offering a contents delivery service according to an embodiment of this invention. Specifically, the storage unit 132 may store a streaming list 132*a* and subscriber information 132*b*. Here, the streaming list 132*a* is information about one or more streaming contents being currently received from the contents providing server 140, and the subscriber information 132*b* is information about one or more terminal devices 110 that receive respective streaming contents. In particular, the streaming list 132*a* and the subscriber information 132*b* may be managed in the form of a table in which streaming contents received from the contents providing serer 130 are mapped respectively to the corresponding terminal devices 110 for receiving such streaming contents.

The control unit 133 is an element configured to perform the whole control of the contents transmission control device 130 and to control a signal flow for performing functions of the communication unit 131 and storage unit 132. Briefly, in response to a request for streaming content from the terminal device 110, the control unit 133 determines, using the streaming list 132a, whether the requested streaming content is being currently received. Also, for prefix caching of the local caching device 120, the control unit 133 branches the streaming content, being currently received, and then, after delay, delivers the branched streaming content to the local caching device 120.

Specifically, the control unit 133 monitors the network 150 through the communication unit 131 and thereby receives a request, sent to the contents providing server 140 by the terminal device 110, for streaming content or a request for streaming content from the local caching device 120. For determining whether the requested streaming content is being currently received, the control unit 133 determines whether the requested streaming content is registered in the streaming list 132a.

First, a case where the requested streaming content is registered in the streaming list 132a will be described hereinafter.

If the requested streaming content is registered in the streaming list 132a, this means that the requested streaming content has been already requested by a certain terminal device 110. Thus, the contents transmission control device 130 may be able to transmit the streaming content, being currently received, to other terminal device 110.

Therefore, if the requested streaming content is registered in the streaming list 132a, the control unit 133 branches the requested streaming content, being currently received from the contents providing server 140, and then delays the branched streaming content for a predetermined time. Here, the predetermined time (i.e., a delay value) may be set depending on a time required for a caching hit which means that the local caching device 120 determines whether the identical content has been cached. In addition, since such a caching hit is performed in the unit of content division (in the unit of chunk), the predetermined time (delay value) may be varied depending on a time required for the terminal device 110 to play one chunk divided from the requested streaming content. For example, in an embodiment of this invention, the predetermined time, which is a playback time of one chunk divided from streaming content, may be set for 5 seconds.

Additionally, the control unit 133 registers, in the subscriber information 132b, the terminal device 110 that requests streaming content. Also, the control unit 133 delivers, through the communication unit 131, streaming-delayed streaming content to the local caching device 120 that requests the streaming content.

Further, the control unit 133 determines whether a caching hit notification for streaming content is received from the local caching device 120 through the communication unit 131.

If a caching hit notification for streaming content is received from the local caching device 120, prefix caching of streaming content at the local caching device 120 corresponds to a case of hit. In this case, rather than interrupts delivery of delayed streaming content to the local caching device 120, the control unit 133 sends a chunk signature for identifying a chunk, divided from the delayed streaming content, to the local caching device 120 through the communication unit 133 until a request for interruption of streaming content is received from the local caching device 120.

Next, a case where the requested streaming content is not registered in the streaming list 132a will be described hereinafter.

If the requested streaming content is not registered in the streaming list 132a, this means that the requested streaming content has been not yet requested by any terminal device 110. Thus, the contents transmission control device 130 may have to newly receive streaming content from the contents providing server 140 so as to offer the streaming content to the terminal device 110.

Therefore, if the requested streaming content is not registered in the streaming list 132a, the control unit 133 delivers a request for streaming content to the contents providing server 140 through the communication unit 131. In addition, the control unit 133 monitors the network 150 through the communication unit 131 and receives streaming content being sent to the terminal device 110 by the contents providing server 140.

The control unit 133 registers, in the streaming list 132a, streaming content received from the contents providing server 140 and registers, in the subscriber information 132b, the terminal device 110 that requests the streaming content. Also, the control unit 133 delivers streaming content, received through the communication unit 131, to the local caching device 120 requesting the streaming content until a request for interruption of streaming content is received from the local caching device 120.

Hereinafter, a case where a streaming interruption request is received from the local caching device 120 will be described.

The control unit 133 monitors the network 150 through the communication unit 131 and receives an interruption request for streaming content sent to the contents providing server 140 by the terminal device 110. Then the control unit 133 interrupts the transmission of streaming content or chunk signature being sent to the local caching device 120. Also, the control unit 133 deletes, from the subscriber information 132b, the registered terminal device 110 that requests interruption. And also, the control unit 133 determines whether the number of the terminal devices 110 registered in the subscriber information 132b to receive interruption-requested streaming content is zero.

If the number of the terminal devices 110 registered in the subscriber information 132 to receive interruption-requested streaming content is zero, the control unit 133 interrupts the reception of the interruption-requested streaming content being currently received from the contents providing server 140. Also, the control unit 133 deletes the interruption-requested streaming content from the streaming list 132a.

Hereinafter, the configuration of the local caching device 120 according to an embodiment of this invention will be described in detail.

Figure 3:
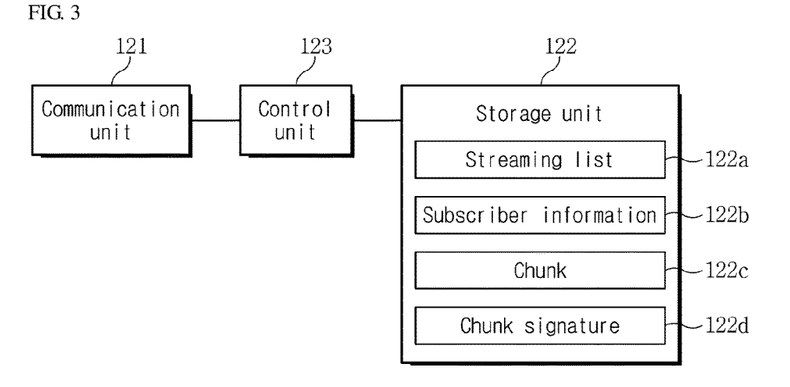
FIG. 3 is a block diagram illustrating the configuration of a local caching device according to an embodiment of the present invention.

FIG. 3 is a block diagram illustrating the configuration of the local caching device 120 according to an embodiment of the present invention. The configuration of the local caching device 120 shown in FIG. 3 indicates functional elements distinguished functionally from each other, and one or more thereof may be physically divided from or integrated with each other.

Referring to FIG. 3, the local caching device 120 according to an embodiment of this invention may be configured to include a communication unit 121, a storage unit 122, and a control unit 123.

The communication unit 121 is an element configured to transmit or receive data to or from the contents transmission control device 130 and the terminal device 110. Specifically, the communication unit 121 monitors the network 150, receives streaming content or a request therefor being transmitted between the terminal device 110 and the contents providing server 140, and then delivers it to the control unit 123. Also, the communication unit 121 may transmit a request for streaming content to the contents transmission control device 130 through the network 150 and transmit streaming content to the terminal device 110.

The storage unit 122 is an element configured to store information and programs required for offering a contents delivery service according to an embodiment of this invention. Specifically, the storage unit 122 may store a streaming list 122a, subscriber information 122b, a chunk 122c, and a chunk signature 122d. Here, the streaming list 122a is information about one or more streaming contents being received from the contents transmission control device 130, and the subscriber information 122b is information about one or more terminal devices 110 that receive streaming contents. The chunk 122c is data divided from streaming content received from the contents transmission control device 130, and the chunk signature 122d is an identifier for identifying each chunk. In particular, the streaming list 122a and the subscriber information 122b may be managed in the form of a table in which streaming contents received from the contents providing serer 130 are mapped respectively to the corresponding terminal devices 110 for receiving such streaming contents. Further, the chunk 122c and the chunk signature 122d may be managed in the form of a table in which the chunks 122c divided from streaming contents received from the contents providing serer 130 are mapped respectively to the corresponding chunk signatures 122d for identifying such chunks.

The control unit 123 is an element configured to perform the whole control of the local caching device 120 and to control a signal flow for performing functions of the communication unit 121 and storage unit 122. Briefly, the control unit 123 receives streaming contents from the contents providing server 140 and stores them. Also, when a request for streaming content is received from the terminal device 110, the control unit 123 delivers the stored streaming content to the terminal device 110.

Specifically, the control unit 123 monitors the network 150 through the communication unit 121 and thereby receives a request, sent to the contents providing server 140 by the terminal device 110, for streaming content. Then the control unit 123 delivers the received request for streaming content to the contents transmission control device 130 through the communication unit 121. Also, the control unit 123 receives streaming content, as a response to the delivered request, from the contents transmission control device 130 through the communication unit 121.

The control unit 123 determines whether any chunk corresponding to a chunk divided from the received streaming content is stored in the storage unit 122, and thereby determines whether prefix caching for streaming content is a hit or not. Here, a chunk is data divided from streaming content received from the contents transmission control device 130. In order to guarantee reliability of prefix caching, the control unit 123 may determine that the requested streaming content is identical only if a given number of chunks divided from received streaming content are sequentially hit. For example, only if three chunks are sequentially hit, the local caching device 120 may determine that the requested streaming content is identical.

First, a case where any chunk corresponding to a chunk divided from received streaming content is stored in the storage unit 122 will be described hereinafter.

If any chunk corresponding to a chunk divided from received streaming content is stored in the storage unit 122, this means that the streaming content is being already received from the contents transmission control device 130. Thus, the local caching device 120 may be able to transmit the received streaming content to other terminal device 110. Therefore, in this case, the control unit 123 determines that prefix caching for the requested streaming content is hit, and then transmits a caching hit notification for the streaming content to the content transmission control device 130 through the communication unit 121.

The control unit 123 receives a chunk signature from the contents transmission control device 130 through the communication unit 121 rather than interrupts the reception of streaming content from the contents transmission control device 130 through the communication unit 121. Then, using the received chunk signature, the control unit 123 transmits streaming content to the terminal device 110 through the communication unit 121. Here, the control unit 123 may transmit streaming content to the terminal device 110 until a request for interruption of streaming content is received from the terminal device 110.

Next, a case where any chunk corresponding to a chunk divided from received streaming content is not stored in the storage unit 122 will be described hereinafter.

If any chunk corresponding to a chunk divided from received streaming content is not stored in the storage unit 122, this means that the streaming content has been not yet requested by any terminal device 110. Thus, the local caching device 120 may have to newly receive streaming content from the contents transmission control device 130 so as to offer the streaming content to the terminal device 110. Therefore, in this case, the control unit 123 determines that prefix caching for the requested streaming content is missed, and then stores streaming content, being currently received, for a predetermined time from the current time point. Here, the predetermined time may be, but not limited to, a time required for the terminal device 110 to play a given number of chunks divided from the received streaming content. Additionally, in case the local caching device 120 performs prefix caching of stored streaming content and delivers it to the terminal device 110, a storage maintenance time may be a short time enough for a user of the terminal device 110 to feel as if streaming content is received in real time. However, a storage maintenance time may be a long time near the limit of being supportable by a physical environment of the local caching device 120.

Also, the control unit 123 delivers streaming content, received from the contents transmission control device 130 through the communication unit 121, to the terminal device 110 until a request for interruption of streaming content is received from the terminal device 110.

Hereinafter, a transmission flow of streaming content according to an embodiment of this invention will be described in detail.

Figure 4A:
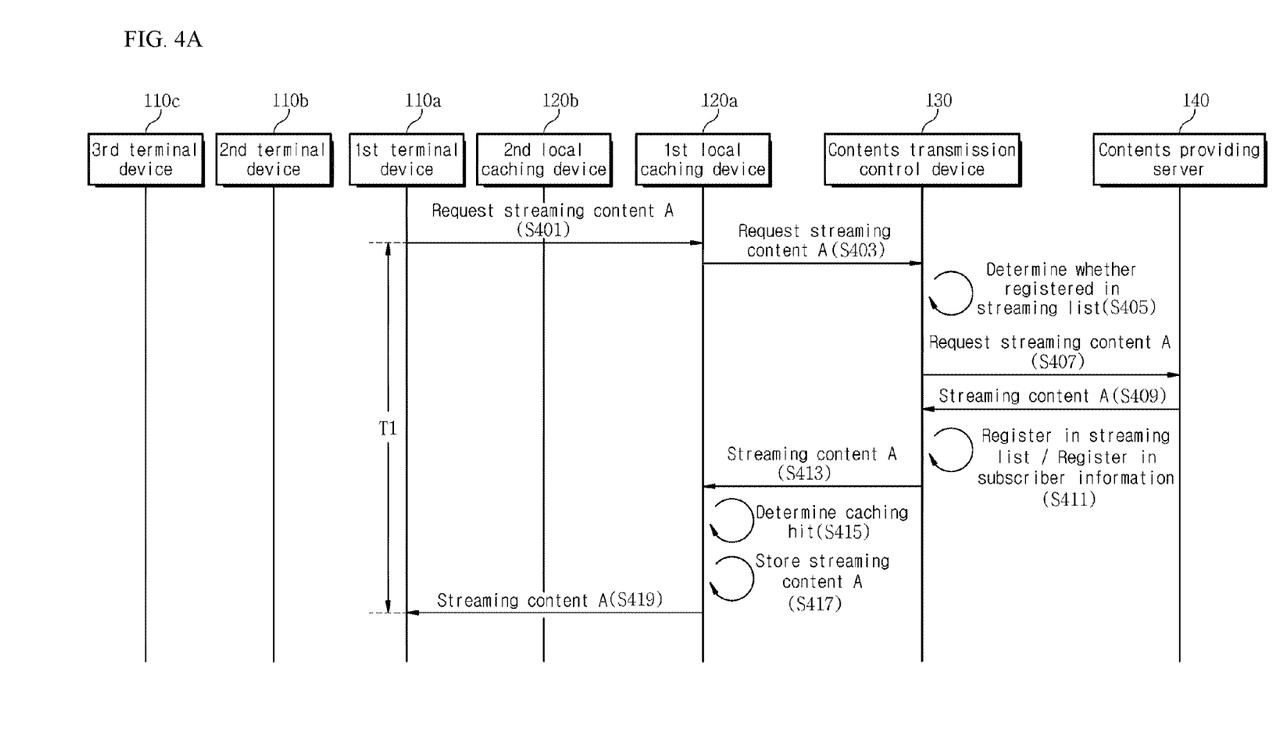
FIGS. 4A and 4B are flow diagrams illustrating a transmission process of streaming content according to an embodiment of the present invention.
Figure 4B:
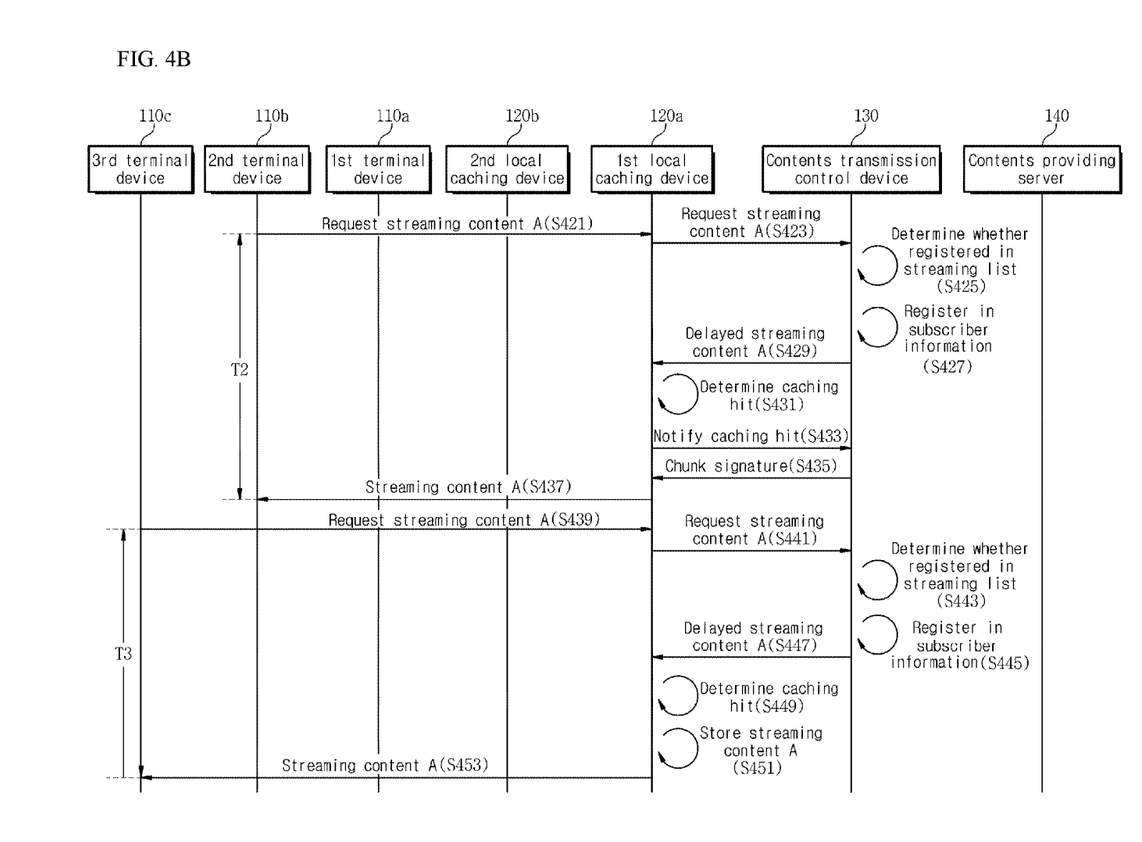

FIGS. 4A and 4B are flow diagrams illustrating a transmission process of streaming content according to an embodiment of the present invention. In the following description, for convenience, the plurality of terminal devices 110 will be separated into the first terminal device 110*a* to the third terminal device 110*c*, and the plurality of local caching devices 120 will be separated into the first local caching device 120*a* and the second local caching device 120*b*.

Additionally, let's suppose that the first terminal device 110*a* to the third terminal device 110*c* request the same streaming content A. Further, let's suppose that, by a load balancer (a global server load balancing, GSLB), the first and second terminal devices 110*a* and 110*b* are connected to the first local caching device 120*a*, and the third terminal device 110*c* is connected to the second local caching device 120*b*.

Also, requests for streaming content A of the first and second terminal devices 110*a* and 110*b* are transmitted to the contents providing server 140 via the first local caching device 120*a* and the contents transmission control device 130. Similarly, a request for streaming content A of the third terminal device 110*c* is transmitted to the contents providing server 140 via the second local caching device 120*b* and the contents transmission control device 130. In this case, the first and second local caching devices 120*a* and 120*b* and the contents transmission control device 130 may intercept and thereby receive such requests being transmitted to the contents providing server 140 through the network 150.

First, a flow of providing streaming content A to the first terminal device 110*a* will be described hereinafter.

Referring to FIG. 4A, the first terminal device 110*a* transmits a request for streaming content A to the contents providing server 140 through the network 150. The first local caching device 120*a* monitors the network 150 and receives the request, sent by the first terminal device 110*a*, for the streaming content A (S401).

The first local caching device 120*a* delivers, to the contents transmission control device 130, the request for the streaming content A received through step S401 (S403). The contents transmission control device 130 monitors the network 150 and, for determining whether the streaming content A in the request delivered through step S403 is being already received, determines whether the streaming content A requested through step S403 is registered in the streaming list 132*a* (S405). Since the requested streaming content A is not registered in the streaming list 132*a* as the result of determination at step S405, the contents transmission control device 130 determines that the streaming content A is not yet received, and then delivers the request for the streaming content A to the contents providing server 140 (S407).

The contents providing server 140 transmits streaming content to the first terminal device 110*a* in response to step S407, and the contents transmission control device 130 monitors the network 150 and receives the streaming content transmitted by the contents providing server 140 (S409).

The content transmission control device 130 registers, in the streaming list 132*a*, the streaming content A received through step S409 and also registers, in the subscriber information 132*b*, the first terminal device 110*a* that requests the streaming content A through step S401 (S411). Also, the contents transmission control device 130 delivers, to the first local caching device 120*a*, the streaming content A being received through step S409 (S413).

The first local caching device 120*a* determines a hit or not of prefix caching for the streaming content A by determining whether any chunk corresponding to a chunk divided from the streaming content A received through step S413 is stored (S415). Since any chunk corresponding to a chunk divided from the streaming content A is not stored as the result of determination at step S415, the first local caching device 120*a* determines that prefix caching is missed, and then stores the streaming content A, being received through step S413, for a predetermined time from the current time point (S417). Let's suppose that at step S417 the first local caching device 120*a* stores three chunks divided from the received streaming content A. Also, the first local caching device 120*a* delivers the streaming content A, being received through step S413, to the first terminal device 110*a* (S419).

As a result, since the first terminal device 110*a* requests the streaming content A through step S401 and then receives it through step S419, a time spent between requesting and receiving the streaming content A will be T1.

Next, a flow of providing streaming content A to the second terminal device 110*b* will be described hereinafter with reference to FIG. 4B.

Referring to FIG. 4B, the second terminal device 110*b* transmits a request for streaming content A to the contents providing server 140 through the network 150. The first local caching device 120*a* monitors the network 150 and receives the request, sent by the second terminal device 110*b*, for the streaming content A (S421).

The first local caching device 120*a* delivers, to the contents transmission control device 130, the request for the streaming content A received through step S421 (S423).

The contents transmission control device 130 monitors the network 150 and, for determining whether the streaming content A in the request delivered through step S423 is being already received, determines whether the streaming content A requested through step S423 is registered in the streaming list 132*a* (S425). Since the requested streaming content A is registered in the streaming list 132*a* through step S411 as the result of determination at step S425, the contents transmission control device 130 determines that the streaming content A is being already received, and then registers, in the subscriber information 132*b*, the second terminal device 110*b* that requests the streaming content A through step S421 (S427). Also, the contents transmission control device 130 branches the streaming content A being currently received through step S409, delays the branched streaming content A for a predetermined time, and delivers the delayed streaming content A to the first local caching device 120*a* (S429). Let's suppose that at step S429 the contents transmission control device 130 delays the branched streaming content A for a time required for the second terminal device 110*b* to play one chunk divided from the branched streaming content A.

The first local caching device 120*a* determines a hit or not of prefix caching for the streaming content A by determining whether any chunk corresponding to a chunk divided from the streaming content A received through step S429 is stored (S431). In order to guarantee reliability of prefix caching, let's suppose that the first local caching device 120*a* determines that streaming content A is identical only if three chunks divided from the streaming content A received through step S429 are hit. Since three chunks corresponding to three chunks divided from the streaming content A are stored through step S417 as the result of determination at step S431, the first local caching device 120*a* determines that prefix caching is hit, and then transmits a cache hit notification for the streaming content A to the contents providing control device 130 (S433).

Since receiving a caching hit notification for the streaming content A through step S433, the contents transmission control device 130 transmits a chunk signature for identifying a chunk, divided from delayed streaming content A, to the first local caching device 120*a* rather than interrupts the delivery of delayed streaming content A being delivered through step S429 (S435).

Then, using the chunk signature received through step S435, the first local caching device 120*a* transmits, to the second terminal device 110*b*, streaming content A stored through step S417 (S437).

As a result, since the second terminal device 110*b* requests the streaming content A through step S421 and then receives it through step S437, a time spent between requesting and receiving the streaming content A will be T2. Particularly, transmitting the streaming content A, being currently sent to the first terminal device 110*a*, to the second terminal device 110*b* may reduce traffic between the contents transmission control device 130 and the contents providing server 140. Additionally, a hit of prefix caching at step S431 may reduce traffic between the first local caching device 120*a* and the contents transmission control device 130. Therefore, a required time T2 may be shorter than a required time T1.

Finally, a flow of providing streaming content A to the third terminal device 110*c* will be described hereinafter.

The third terminal device 110*c* transmits a request for streaming content A to the contents providing server 140 through the network 150, and the second local caching device 120*b* monitors the network 150 and receives the request, sent by the third terminal device 110*c*, for the streaming content A (S439).

The second local caching device 120*b* delivers, to the contents transmission control device 130, the request for the streaming content A received through step S439 (S441).

The contents transmission control device 130 monitors the network 150 and, for determining whether the streaming content A in the request delivered through step S441 is being already received, determines whether the streaming content A requested through step S441 is registered in the streaming list 132*a* (S443). Since the requested streaming content A is registered in the streaming list 132*a* through step S411 as the result of determination at step S443, the contents transmission control device 130 determines that the streaming content A is being already received, and then registers, in the subscriber information 132*b*, the third terminal device 110*c* that requests the streaming content A through step S439 (S445). Also, the contents transmission control device 130 branches the streaming content A being currently received through step S409, delays the branched streaming content A for a predetermined time, and delivers the delayed streaming content A to the second local caching device 120*b* (S447). Let's suppose that at step S447 the contents transmission control device 130 delays the branched streaming content A for a time required for the third terminal device 110*c* to play one chunk divided from the branched streaming content A.

The second local caching device 120*b* determines a hit or not of prefix caching for the streaming content A by determining whether any chunk corresponding to a chunk divided from the streaming content A received through step S447 is stored (S449). Since any chunk corresponding to a chunk divided from the streaming content A is not stored as the result of determination at step S449, the second local caching device 120*b* determines that prefix caching is missed, and then stores the streaming content A, being received through step S447, for a predetermined time from the current time point (S451). Let's suppose that at step S451 the second local caching device 120*b* stores three chunks divided from the received streaming content A. Also, the second local caching device 120*b* delivers the streaming content A, being received through step S447, to the third terminal device 110*c* (S453).

As a result, since the third terminal device 110*c* requests the streaming content A through step S439 and then receives it through step S453, a time spent between requesting and receiving the streaming content A will be T3. Particularly, transmitting the streaming content A, being currently sent to the first terminal device 110*a*, to the third terminal device 110*c* may reduce traffic between the contents transmission control device 130 and the contents providing server 140. Additionally, a miss of prefix caching at step S449 may not reduce traffic between the second local caching device 120*b* and the contents transmission control device 130. Therefore, a required time T3 may be shorter than a required time T1 but be longer than a required time T2.

Hereinafter, a method for providing streaming content at the contents transmission control device 130 according to an embodiment of this invention will be described in detail.

Figure 5:
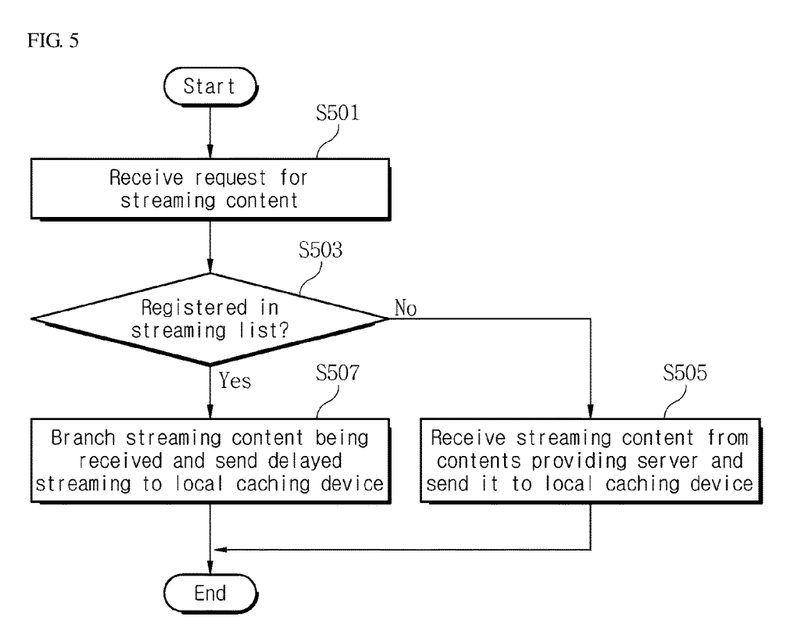
FIG. 5 is a flow diagram illustrating a method for providing streaming content at a contents transmission control device according to an embodiment of the present invention.

FIG. 5 is a flow diagram illustrating a method for providing streaming content at the contents transmission control device 130 according to an embodiment of the present invention.

Referring to FIG. 5, the contents transmission control device 130 monitors the network 150 and receives a request, sent to the contents providing server 140 by the terminal device 110, for streaming content or a request for streaming content from the local caching device 120 (S501).

For determining whether the streaming content requested through step S501 is being already received, the contents transmission control device 130 determines whether the requested streaming content is registered in the streaming list 132*a* (S503).

In case the requested streaming content is not registered in the streaming list 132*a* as the result of determination at step S503, the contents transmission control device 130 determines that the requested streaming content is not yet received, receives the streaming content from the contents providing server 140, and then delivers the received streaming content to the local caching device 120 (S505).

On the contrary, in case the requested streaming content is registered in the streaming list 132*a* as the result of determination at step S503, the contents transmission control device 130 determines that the requested streaming content is being already received, branches the streaming content being already received from the contents providing server 140, delays the branched streaming content for a predetermined time, and then delivers the delayed streaming content to the local caching device 120 (S507). Here, the predetermined time may be, but not limited to, a time required for the terminal device 110 to play one chunk divided from the requested streaming content.

Figure 6:
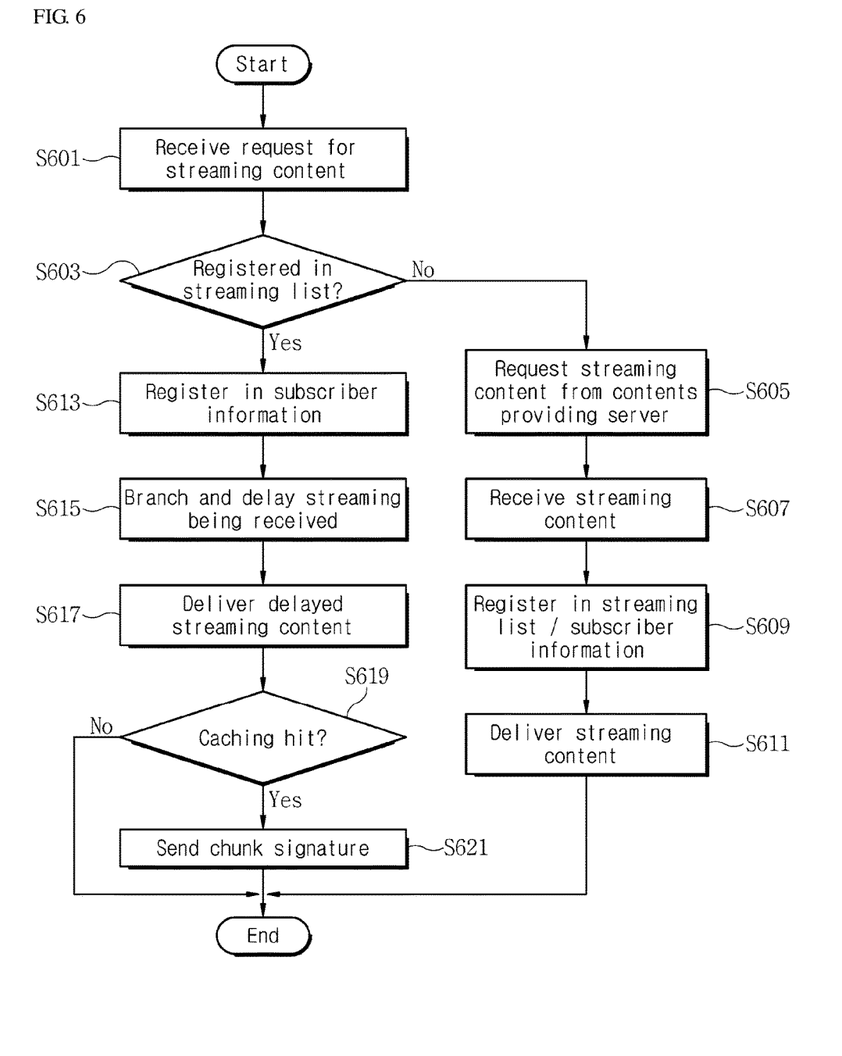
FIG. 6 is a flow diagram illustrating another method for providing streaming content at a contents transmission control device according to an embodiment of the present invention.

FIG. 6 is a flow diagram illustrating another method for providing streaming content at the contents transmission control device 130 according to an embodiment of the present invention.

Referring to FIG. 6, the contents transmission control device 130 monitors the network 150 and receives a request, sent to the contents providing server 140 by the terminal device 110, for streaming content or a request for streaming content from the local caching device 120 (S601).

For determining whether the streaming content requested through step S601 is being already received, the contents transmission control device 130 determines whether the requested streaming content is registered in the streaming list 132*a* (S603).

In case the requested streaming content is not registered in the streaming list 132*a* as the result of determination at step S603, the contents transmission control device 130 determines that the requested streaming content is not yet received, and then delivers the request, received through step S601, for the streaming content to the contents providing server 140 (S605).

The contents transmission control device 130 monitors the network 150 and receives the streaming content sent to the terminal device 110 by the contents providing server 140 (S607). Also, the content transmission control device 130 registers, in the streaming list 132*a*, the streaming content received through step S607 and also registers, in the subscriber information 132*b*, the terminal device 110 that requests the streaming content (S609).

Also, the contents transmission control device 130 delivers, to the local caching device 120, the streaming content being received through step S607 (S611).

On the contrary, in case the requested streaming content is registered in the streaming list 132*a* as the result of determination at step S603, the contents transmission control device 130 determines that the requested streaming content is being already received, and then registers, in the subscriber information 132*b*, the terminal device 110 that requests the streaming content (S613).

The contents transmission control device 130 branches the streaming content being already received, and delays the branched streaming content for a predetermined time (S615). Then the contents transmission control device 130 delivers the streaming content, delayed through step S615, to the local caching device 120 (S617).

Further, the contents transmission control device 130 determines a hit or not of prefix caching for the streaming content by determining whether a cache hit notification is received from the local caching device 120 (S619).

If it is determined at step S619 that the caching hit notification is received, the contents transmission control device 130 determines that prefix caching for the streaming content is hit at the local caching device 120, and then transmits, rather than interrupts the delivery of delayed streaming content, a chunk signature for identifying a chunk, divided from delayed streaming content, to the local caching device 120 until a request for interruption of streaming content is received from the local caching device 120 (S621).

Figure 7:
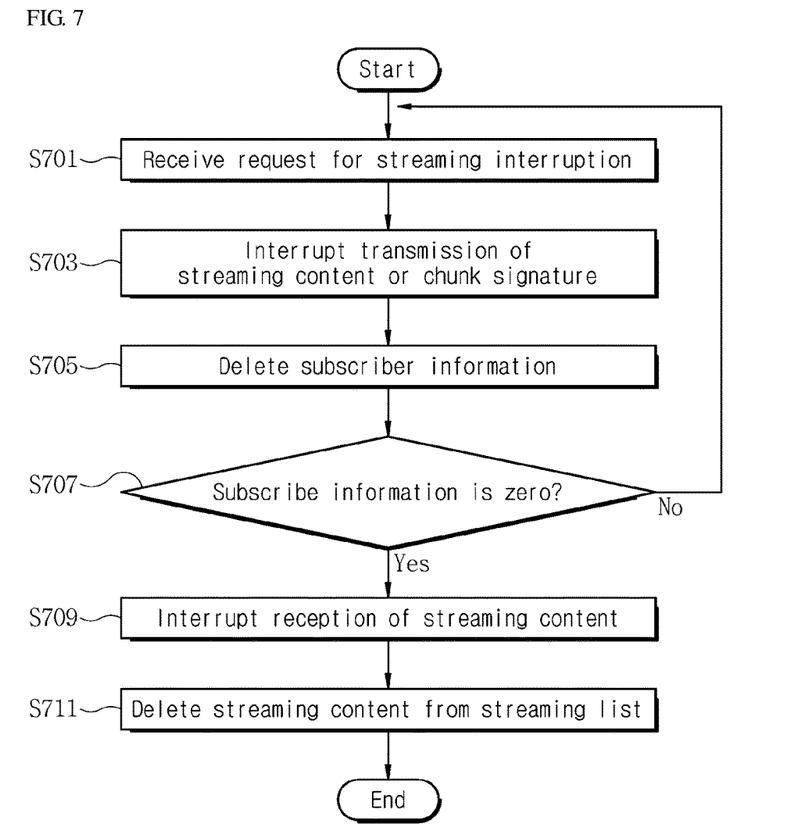
FIG. 7 is a flow diagram illustrating a process of interrupting the provision of streaming content at a contents transmission control device according to an embodiment of the present invention.

FIG. 7 is a flow diagram illustrating a process of interrupting the provision of streaming content at the contents transmission control device 130 according to an embodiment of the present invention.

Referring to FIG. 7, the contents transmission control device 130 monitors the network 150 and receives an interruption request, sent to the contents providing server 140 by the terminal device 110, for streaming content (S701).

Then the contents transmission control device 130 interrupts the transmission of streaming content or chunk signature being sent to the local caching device 120 (S703). Also, the contents transmission control device 130 deletes, from the subscriber information 132*b*, the registered terminal device 110 that requests interruption (S705).

Then the contents transmission control device 130 determines whether the number of the terminal devices 110 registered in the subscriber information 132*b* to receive interruption-requested streaming content is zero as the result of deletion at step S705 (S707).

If it is determined at step S707 that the number of the terminal devices 110 for receiving the interruption-requested streaming content is greater than zero, the contents transmission control device 130 waits without performing subsequent steps.

On the contrary, if it is determined at step S707 that the number of the terminal devices 110 for receiving the interruption-requested streaming content is zero, the contents transmission control device 130 interrupts the reception of the interruption-requested streaming content being currently received from the contents providing server 140 (S709).

Also, the contents transmission control device 130 deletes the interruption-requested streaming content from the streaming list 132*a* (S711).

Hereinafter, a method for providing streaming content at the local caching device 120 according to an embodiment of this invention will be described in detail.

Figure 8:
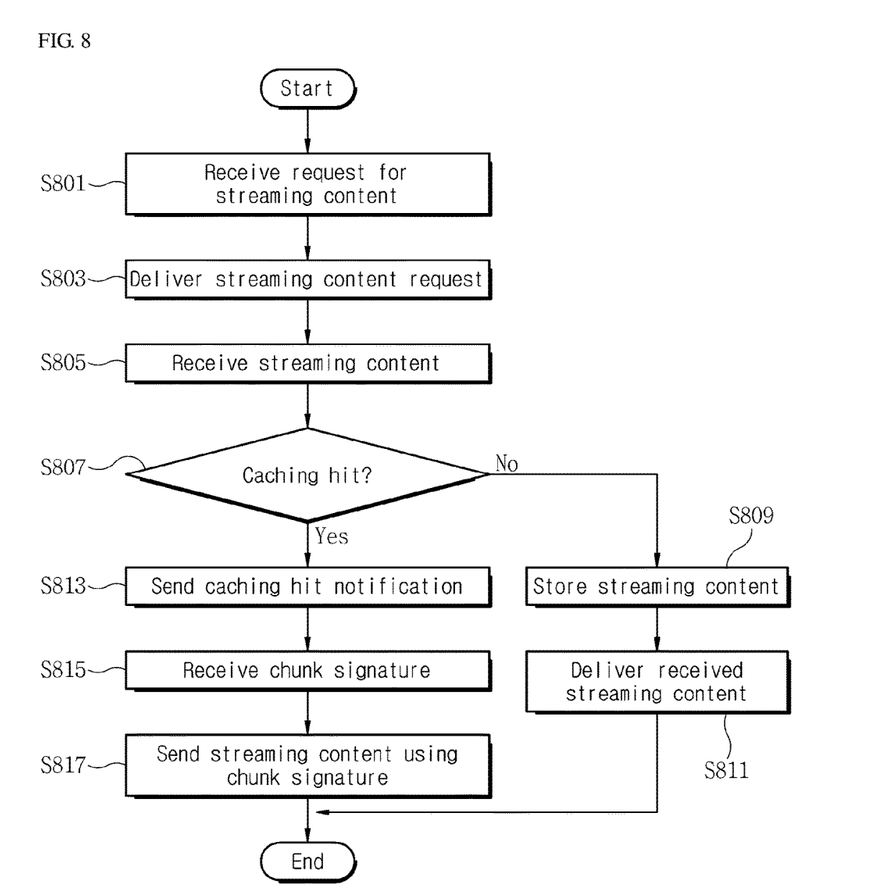
FIG. 8 is a flow diagram illustrating a method for providing streaming content at a local caching device according to an embodiment of the present invention.

FIG. 8 is a flow diagram illustrating a method for providing streaming content at the local caching device 120 according to an embodiment of the present invention.

Referring to FIG. 8, the local caching device 120 monitors the network 150 and receives a request, sent to the contents providing server 140 by the terminal device 110, for streaming content (S801). Then the local caching device 120 delivers the request, received through step S801, for streaming content to the contents transmission control device 130 (S803). Also, the local caching device 120 receives streaming content, as a response to the delivered request at step S803, from the contents transmission control device 130 (S805).

The local caching device 120 determines whether any chunk corresponding to a chunk divided from the streaming content, received through step S805, is stored, and thereby determines whether prefix caching for streaming content is a hit or not (S807). Here, in order to guarantee reliability of prefix caching, the local caching device 120 may determine that the requested streaming content is identical only if a given number of chunks divided from the streaming content, received through step S805, are sequentially hit.

If it is determined at step S807 that any chunk corresponding to a chunk divided from the received streaming content is not stored, the local caching device 120 determines that prefix caching for the requested streaming content is missed, and then stores streaming content, being currently received through step S805, for a predetermined time from the current time point. Here, the predetermined time may be, but not limited to, a time required for the terminal device 110 to play a given number of chunks divided from the streaming content received through step S805. Additionally, in case the local caching device 120 performs prefix caching of stored streaming content and delivers it to the terminal device 110, a storage maintenance time may be a short time enough for a user of the terminal device 110 to feel as if streaming content is received in real time. However, a storage maintenance time may be a long time near the limit of being supportable by a physical environment of the local caching device 120. Also, the local caching device 120 delivers streaming content, received through step S805, to the terminal device 110 until a request for interruption of streaming content is received from the terminal device 110 (step S811).

On the contrary, if it is determined at step S807 that any chunk corresponding to a chunk divided from the received streaming content is stored, the local caching device 120 determines that prefix caching for the requested streaming content is hit, and then transmits a caching hit notification for the streaming content to the content transmission control device 130. The local caching device 120 receives a chunk signature from the contents transmission control device 130 rather than interrupts the reception of streaming content from the contents transmission control device 130 (S815). Then, using the chunk signature received through step S815, the local caching device 120 transmits streaming content to the terminal device 110 (S817). Here, the local caching device 120 may transmit streaming content to the terminal device 110 until a request for interruption of streaming content is received from the terminal device 110.

As fully discussed above, in a contents delivery service, the content transmission system 100 according to an embodiment of this invention permits caching as well as splitting for the local caching device 120, thus reducing a traffic concentration for a CP and a load of network traffic due to duplicate transmission of contents.

Particularly, the content transmission system 100 according to an embodiment of this invention branches streaming content, being already received by the contents transmission control device 130, delays the branched streaming content, and delivers the delayed streaming content to the local caching device 120, thereby allowing transmission using prefix caching of streaming content to the terminal device 110 at the local caching device 120.

Embodiments of this invention may be implemented by means of various manners, e.g., hardware, firmware, software, or combinations thereof. In case of implementation by hardware, an embodiment of this invention may be implemented by one or more ASICs (application specific integrated circuits), DSPs (digital signal processors), DSPDs (digital signal processing devices), PLDs (programmable logic devices), FPGAs (field programmable gate arrays), processors, controllers, micro controllers, micro processors, etc.

Additionally, in case of implementation by firmware or software, an embodiment of this invention may be implemented in the form of a module, a procedure, a function, etc. for performing functions or operations discussed above, and then recorded on a computer-readable non-transitory storage medium through various computing manners. Here, this medium may contain, alone or in combination, program instructions, data files, data structures, and the like. These program instructions recorded in the medium may be specially designed and constructed for the present invention or well known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions may include machine language codes made by a complier and high-level language codes executable in a computer using an interpreter or the like. These hardware devices may be configured to operating as one or more of software to perform the operation of this invention, and vice versa.

The present invention may be embodied in many different forms and should not be construed as limited to the embodiments set forth herein. Rather, the disclosed embodiments are provided so that this disclosure will be thorough and complete, and will fully convey the scope of this invention to those skilled in the art. The principles and features of the present invention may be employed in varied and numerous embodiments without departing from the scope of the invention.

Additionally, any device or terminal according to this invention may be operated by commands that enable one or more processors to perform the above-discussed functions and process. For example, such commands may include interpretable commands such as script command, e.g., JavaScript or ECMAScript, executable code, or other commands stored in a computer-readable medium. Further, devices according to this invention may be implemented in a distributed form, such as Server Farm, over the network or implemented in a single computer device.

A computer program (also known as a program, software, software application, script, or code) that is mounted in the device according to this invention and executes the method according to this invention may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

In embodiments, all steps and messages are not a target for selective implementation or omission. Additionally, in each embodiment, steps may not be always performed in the order described and may be changed in order. Similarly, delivery of messages may not be always performed in the order described and may be changed in order. Each step and messaging may be performed independently.

Additionally, while operations are depicted in the drawings in a particular order, this should not be understood as require such operations be performed in the particular order shown or in sequential order, or that all illustrated operation be performed to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

The system according to the present invention is applicable to the field of CDN in which a local caching device can deliver contents by performing caching together with splitting for streaming contents in real-time transmission of broadcasting contents to a terminal device such as a smart phone, a laptop, a tablet, or a phablet. Additionally, this invention has industrial applicability since there is sufficient marketability and actual executability.

What is claimed is:

1. A contents transmission control device comprising:
a communication unit configured to
receive a request for a streaming content from a terminal device,
transmit the request to a contents providing server to receive the streaming content in real time from the contents providing server;
a storage unit configured to store a streaming list which is information about one or more streaming contents received from the contents providing server; and a control unit configured to
- determine whether the streaming content requested by the terminal device is registered in the streaming list,
- performing, when the streaming content is determined to be registered in the streaming list, a caching process for a real time transmission to allow a local caching device to cache the streaming content transmitted in real time by
  - (i) branching the streaming content received from the contents providing server,
  - (ii) delaying transmission of the streaming content in a predetermined time, and
  - (iii) transmitting, after the delay for transmission in the predetermined time, the streaming content to the terminal device, and
- performing, when the requested streaming content is not registered in the streaming list, the control unit to
  - (i) deliver the request for the streaming content to the contents providing server,
  - (ii) deliver the streaming content, received from the contents providing server in response to the request, to the terminal device, and
  - (iii) register the streaming content in the streaming list, and
  - (iv) divide the streaming content into a plurality of chunks,
  - (v) receive a caching hit notification for the streaming content from the local caching device through the communication unit during transmission of the streaming content, and
  - (vi) transmit, in response to reception of the caching hit notification, a chunk signature for identifying a chunk among the plurality of chunks streaming content to the local caching device.

2. The contents transmission control device of claim 1, wherein the storage unit is further configured to store subscriber information which is information about one or more terminal devices for receiving the streaming content, and
- wherein the control unit is further configured to, in case of delivering the requested streaming content through the communication unit, register the terminal device requesting the streaming content in the subscriber information, and
- the control unit is further configured to, in case of receiving an interrupt request for the streaming content, delete the terminal device requesting the streaming content from the subscriber information.

3. The contents transmission control device of claim 2, wherein the control unit is further configured to, when the number of the terminal devices registered in the subscriber information is zero,
- interrupt reception of the streaming content from the contents providing server, and
- delete the streaming content from the streaming list.

4. A method performed by a contents transmission control device, the method comprising:
- receiving a request for a streaming content from a terminal device, and transmitting the request to a contents providing server through a network;
- determining whether the streaming content requested by the terminal device is registered in a streaming list which is information about one or more streaming contents received from the contents providing server;
- performing, when the streaming content is determined to be registered in the streaming list, a caching process for a real time transmission to allow a local caching device to cache the streaming content transmitted in real time by
  - (i) branching the streaming content received from the contents providing server,
  - (ii) delaying transmission of the streaming content in a predetermined time, and
  - (iii) transmitting, after the delay for transmission in the predetermined time, the streaming content to the terminal device,
- performing, when the requested streaming content is not registered in the streaming list, controlling processes including:
  - (i) delivering the request for streaming content to the contents providing server;
  - (ii) receiving the streaming content requested by the terminal device from the contents providing server;
  - (iii) registering the streaming content in the streaming list; and
  - (iv) delivering the streaming content to the terminal device through the local caching device,
  - (v) receiving a caching hit notification for the streaming content from the local caching device during transmission of the streaming content, and
  - (vi) transmitting a chunk signature for identifying a chunk of the streaming content to the local caching device.

* * * * *